Oct. 4, 1949.  L. H. POWELL  2,483,932
GLOBE MOUNT

Filed March 12, 1945  3 Sheets-Sheet 1

Inventor
Louis H. Powell
By Robert M. Dunning
Attorney

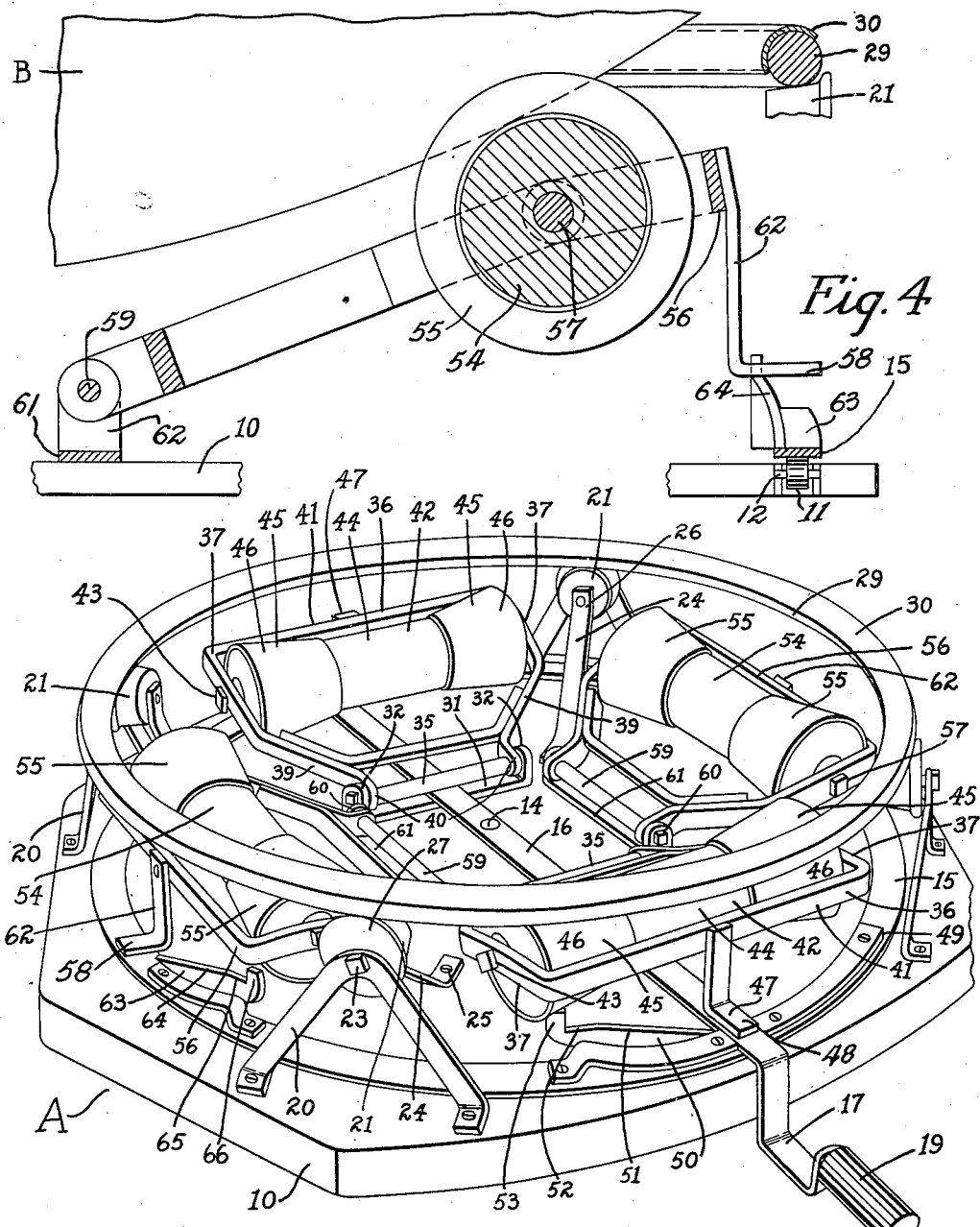

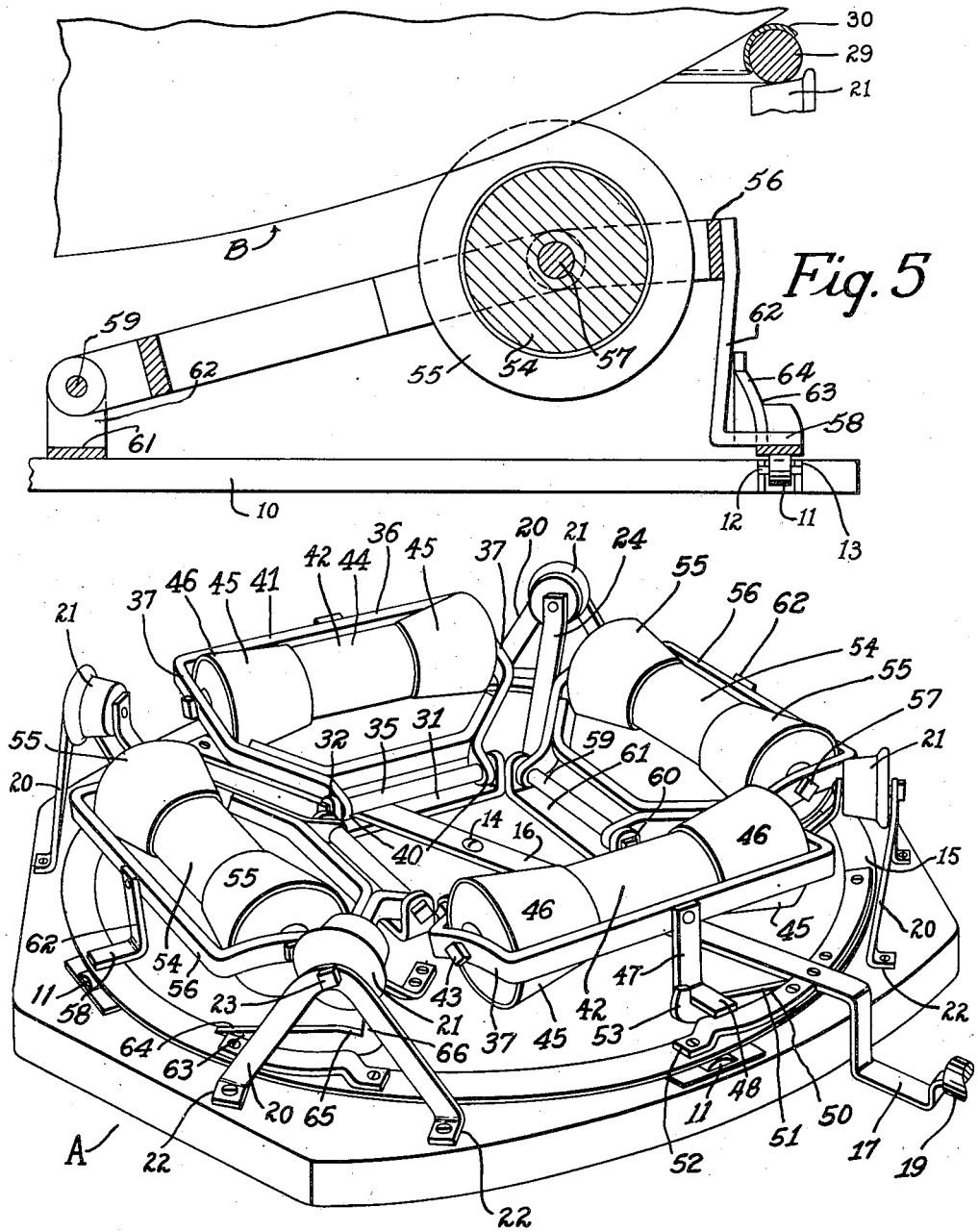

Patented Oct. 4, 1949

2,483,932

UNITED STATES PATENT OFFICE 2,483,932

GLOBE MOUNT

Louis H. Powell, St. Paul, Minn., assignor to Saint Paul Institute, St. Paul, Minn., a corporation of Minnesota Application March 12, 1945, Serial No. 582,302

19 Claims. (Cl. 35—46)

My invention relates to an improvement in globe mount wherein it is desired to provide an apparatus for supporting a large sphere for movement about a plurality of axes.

Difficulty has been encountered in properly supporting a spherical globe such as a large spherical map of the world. Globes have often been supported rotatable about a fixed axis extending through the North and South Poles. This axis has usually been pivoted in a ring girdling the globe which in turn rotates on a track. This axis and ring mechanism greatly impedes complete and long study of the surface of the globe, particularly in the polar areas.

Some smaller globes have also been supported by socket shaped receptacles so that the globe may be oriented in any desired manner. This eliminates visual interference by the mounting. Where the sphere is of large size and is correspondingly heavy, it has been difficult to support the same so that it may be oriented in any desired manner without resort to an axis and ring mounting which gives great visual interference.

Attempts have been made to support the globe upon ball bearings of various sorts. These ball bearings, however, must be supported in sockets and considerable friction often exists between the sockets and the bearings. Furthermore, a sphere supported by ball bearings is supported by points of contact. As a result, unless the sphere is of extremely hard material the ball bearings will have a tendency to mar the surface thereof.

A feature of the present invention resides in the supporting of the sphere upon a hoop or ring which is rotatable about a substantially vertical axis. The hoop or ring may be padded so as to support the globe without danger of injury to the surface thereof. The ring is supported upon flanged rollers arranged on radially extending pivots. The rollers may be of sufficient size to permit easy rotation of the globe about a vertical axis even though the globe is extremely heavy.

A further feature of the present invention resides in providing a pair of curved rollers which are arranged on parallel axes and are engageable with the undersurface of the sphere on opposite sides of the center thereof. These rollers are so supported that they may move upwardly against the surface of the globe so as to raise the globe off the supporting ring. When thus lifted out of contact with the support, the sphere is free to rotate about a transverse axis.

An added feature of the present invention lies in the provision of a second pair of rollers supported on opposite sides of the center of the globe and engageable with the undersurface of the globe. This second pair of rollers are supported on axes arranged at substantially right angles to the area of the first mentioned rollers and are also movable upwardly into engagement with the surface of the globe to raise the same out of contact with its supporting ring. The mechanism supporting the two sets of rollers is so arranged that the rollers are selectively engageable with the globe and act to support the globe rotatable about either of two horizontal axes which intersect at substantially right angles.

A feature of the invention lies in the provision of a globe support which selectively supports the globe rotatable about one of three axes, each of which is at substantially right angles to the remaining two. The globe may be rotated about a vertical axis, or about either of two horizontal axes, thus rendering accessible any desired portion of the globe and readily permitting orientation of that portion of the globe in any desired manner.

A further feature of the present invention resides in the provision of a construction which may not only be placed in the upper portion of a pedestal, but which may be supported in a wall in such a way that only a portion of the surface of the sphere is visible at one time. The supporting structure is so arranged, however, that any selected part of the sphere may be moved into position to be observed.

A feature of the present invention lies in the provision of a means of operating the cams from a central front position, thus allowing complete freedom of orientation while remaining on one side of the globe. This permits the wall installation.

These and other objects and novel features of my invention will be more clearly and fully set forth in the following specification and claims.

In the drawings forming a part of my specification:

Figure 2 is a perspective view of the supporting mechanism for the globe.

Figure 3 is a view similar to Figure 2 showing one set of opposed rollers in elevated position to engage and support the globe rotatable about a horizontal axis.

Figure 4 is a sectional view through one of the supporting rollers in elevated position.

Figure 5 is a view similar to Figure 4 showing one of the supporting rollers in normal lowered position.

Figure 1:
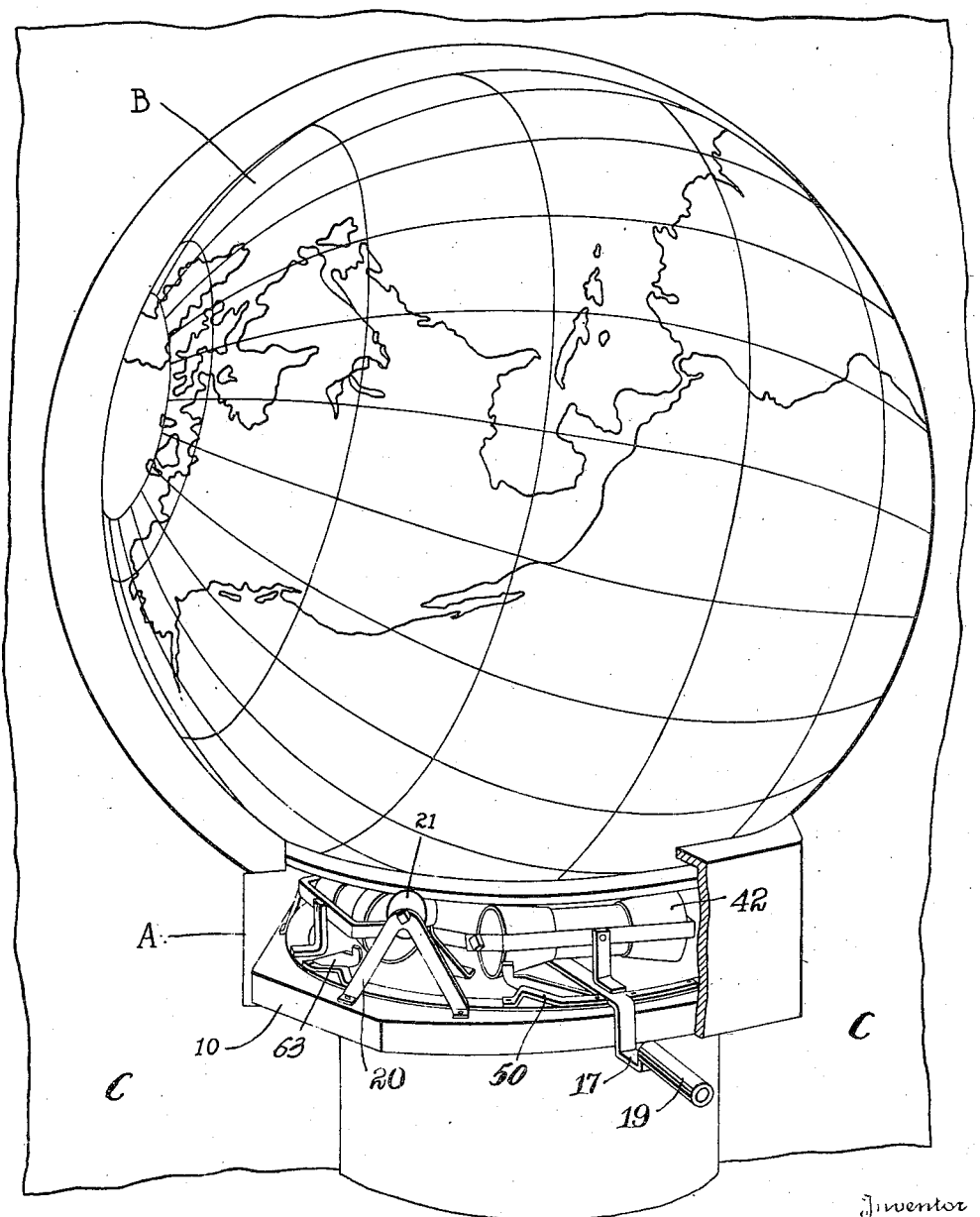
Figure 1 is a perspective view of a globe map and support therefor, a part of the support casing being broken away to disclose the construction thereof.

The globe support A is particularly designed to support a spherical globe map B. With the same mechanism, however, it is possible to support any spherical globe for rotation about vertical and horizontal axes.

The globe support A is preferably mounted upon a base 10 which is shown in Figure 1 as being generally octagonal in form. It will be understood that the outer shape of the base is unimportant, the octagonal shape merely serving to add to the decorative appearance of the support.

A series of angularly spaced rollers 11 are supported by axles 12 in recesses 13 in the base 10. The rollers 11 are equidistant from a center point 14 of the base and the axles 12 are arranged radially with respect to this center point 14. A ring 15 is rotatably supported on the rollers 11. To hold the ring 15 in proper position an arm or spoke 16 extends diametrically across the ring 15, being secured at its ends to the ring and being pivotally supported by the axis or pin 14. The arm 16 may be extended at 17 to support an operating handle 19 by means of which the ring 15 may be rotated upon its supporting rollers 11.

Secured at spaced points about the periphery of the ring 15 I provide brackets 20 supporting flanged rollers 21. The brackets 20 are of A-shape and at their lower extremities are provided with horizontally extending feet 22 by means of which the brackets 20 may be secured to the base 10. The rollers 21 are supported at the upper extremity of the brackets 20 by means of horizontally extending bolts 23 which extend through each bracket 20 and its corresponding roller 21. Ball bearings may or may not be provided within the rollers 21 depending upon the weight of the globe, but such bearings are not shown. An inclined brace 24 is secured to the base by any suitable means, such as by screws or bolts 25, and is provided with vertically extending upper extremities 26 which are positioned inwardly of each roller 21. Thus the bolts 23 extend between the brackets 20 and the braces 24, providing a double support for the flanged rollers 21.

The rollers 21 are provided with an inclined surface terminating in a flange 27 at the outer edge of each roller. The bolts 23 extend radially toward the center of the base and act to support a ring 29 which is preferably substantially circular in cross section. The ring 29 may rotate about a vertical axis due to its support by the rollers 21. The upper surface of the ring 29 is preferably padded with leather, cork, or any suitable padding material indicated at 30. The sphere or globe B normally rests upon the padded surface so that the surface of the sphere is not injured by contact with the ring. The padding 30 also prevents relative movement between the ring and the globe or sphere, so that when the globe is resting upon the ring 29 the globe may be rotated with the ring about a vertical axis. A flat strip 31 is secured to the base 10 on either side of the center pivot 14, the two strips 31 being secured in parallel relationship. Only one of the strips 31 is clearly visible in the perspective views 2 and 3, but both of these elements are similar in construction. A pair of ears 32 extend upwardly from each end of each strip 31 to act as a support for a pivot rod or shaft 35 extending through the ears 32.

A roller supporting frame is pivotally mounted on each of the shafts 35. Each of these roller frames comprises a center portion 36 designed to extend parallel to the shafts 35. The center portion 36 is connected to parallel side portions 37 which are connected by angularly disposed portions 39 to parallel ears 40. The ears 40 are pivotally supported on the shaft 35 between the upstanding ears 32 on the strip 31. Thus each frame 41 is pivotally supported upon its respective shaft 35 for pivotal movement about parallel horizontal axes.

A roller 42 is supported between the parallel side members 37 of each frame 41, being rotatable about a shaft 43 extending through the sides 37. Each roller 42 includes a relatively small diameter center portion 44 and substantially frusto-conical ends 45 thereupon. These ends 45 have their large diameter portions at the ends of the roller and taper toward the small diameter middle portion of the roller 44. The substantially frusto-conical ends 45 are covered with a surface of relatively hard cushioning material such as leather, hard surface cork, or the like. The surfaces 45 are actually arcuated to fit the curvature of the globe which they engage. Thus in place of engaging the surface of the globe at a point of contact, as would be the case if ball bearings were used as the support, the rollers 42 provide a support which engages the sphere along lines of contact.

I have found that where soft material has been used to cover the roller ends, the difficulty of rotating the sphere when supported by the rollers increases. Therefore, I prefer to use a relatively hard material such as leather as the bearing surface.

Each of the frames 41 is provided with a substantially L-shaped arm 47 secured to the intermediate portion 41 thereof. This arm 47 has a right angular end 48 thereon which rests upon the surface of the ring 15 or upon an arcuated strip such as 49 resting upon the ring 15. The only purpose of the arcuated segments 49 is to build up the thickness of the ring equal to the thickness of the arm 16 so that the L-shaped arm 47 may slide over the rod 16 during rotation of the ring 15 relative to the roller supports. An inclined cam 50 is secured to the ring 15 at diametrically opposed portions thereof. The cam 50 is provided with a gradual incline 51 starting at the height of the arm 16 and ending in a horizontal dwell portion 52 at its upper extremity. An upwardly extending end 53 limits movement of the arm 47 at the upper extremity of the cam 50.

In normal lowered position of the rollers 42, the arms 47 are in the position shown in Figure 2 of the drawings. However, should the handle 19 be grasped and moved to the right into the position shown in Figure 3 of the drawings, the ring 15 will carry the cams 50 beneath the L-shaped arms 47, thus urging these arms upwardly until they engage the dwell at the top of each cam. The horizontal dwell portion 52 permits the rollers 42 to remain in the elevated position illustrated in Figure 3 indefinitely, as long as the handle 19 and the arm 16 to which it is attached is in the position shown in Figure 3. By grasping the handle 19 and returning it to the position shown in Figure 2, the arms 47 will again ride down the cams 50 lowering the rollers 42 until the globe or sphere B again rests upon the ring 29.

A similar roller arrangement is mounted upon the base 10 at right angles to the rollers 42. A second pair of rollers 54 having substantially frusto-conical ends 55 are supported by frames 56. The frames 56 support shafts 57 extending through the rollers 54. The shafts 57 are arranged at substantially right angles to the shafts 43 previously described.

The frames 56 are identical to the frames 41 and are pivotally supported upon shafts 59 extending through upstanding ears such as 60 on the parallel strips 61 secured to the base. Thus the frames 56 may support the rollers 54 either in lowered position substantially below the level of the ring 29 or may support the rollers 54 in elevated position in which instance they engage the undersurface of the globe or sphere B and elevate the same from contact with the ring 29.

Each frame 56 is provided with an L-shaped arm 62 having a right angular end 58 which normally rests on the surface of the ring 15. Cams 63, similar to the cams 50, but arranged in reverse relation thereto are mounted upon the ring 15. Each cam 63 is provided with an inclined portion 64, a horizontal dwell portion 65 and an upwardly projecting end 66. Thus the arms 62 may be gradually raised until the arms engage the horizontal portion 65 in which case the rollers 54 have raised sufficiently to elevate the globe B away from the ring 29.

The operation of my globe mount is believed obvious from the foregoing description. The globe normally rests upon the ring 29 and may be rotated about its vertical axis, the ring 29 rotating with the globe and being freely supported by the rollers 21. When it is desired to rotate the globe about a horizontal axis, the handle 19 is grasped and the ring 15 rotated in one direction or the other. If the handle 19 is rotated to the right as illustrated in Figure 2 of the drawings, the supporting structure will be moved into the position shown in Figure 3 of the drawings, thus acting to elevate the rollers 42. The elevation of the rollers 42 raises the globe B out of engagement with the ring 29 and the globe is supported rotatable about a horizontal axis.

If the handle 19 is grasped and rotated toward the left from the position illustrated in Figure 2, the cams 63 will engage the L-shaped arms 62 to pivot the frames 56 about their supporting shafts 59. This movement elevates the rollers 54 into engagement with the globe or sphere elevating this globe out of contact with the ring 29. The globe may then be rotated about a horizontal axis at substantially right angles to the axis of rotation when the mounting mechanism is in the position shown in Figure 3. It will be noted from Figure 1 of the drawings that the globe mounting may be supported in a wall C so that only a portion of the globe or sphere projects outwardly therefrom. With such a construction the globe requires considerably less space within a room. At the same time, however, any portion of the globe may be readily inspected by rotating the sphere about either the vertical axis or one of the horizontal axes specified.

In accordance with the patent statutes, I have described the principles of construction and operation of my globe mount, and while I have endeavored to set forth the best embodiment thereof, I desire to have it understood that obvious changes may be made within the scope of the following claims without departing from the spirit of my invention.

I claim:

1. A globe support comprising a base, means on said base upon which said globe may rest, means supporting said first named means rotatable about a vertical axis, and movably mounted spaced means selectively engageable with said globe on opposite sides of the center thereof to lift the globe out of contact with said first named means, said movably mounted spaced means rotatably supporting said globe.

2. A globe support comprising a base, means on said base upon which said globe may rest, means supporting said first named means rotatable about a vertical axis, roller means selectively engageable with said globe on opposite sides of the center thereof along lines of contact, and means supporting said rollers for selective engagement with said globe and operable to raise the globe out of contact with said first named means.

3. A globe support comprising a base, means upon which said globe may rest, means on said base rotatably supporting said first named means, a pair of spaced roller means engageable with said globe on opposite sides of the center thereof, a second pair of rollers engageable with said globe on opposite sides of the center thereof, the axes of one pair of rollers being arranged at substantially right angles to the axes of the other pair of rollers, and means selectively engaging either of said pairs of rollers against said globe to lift said globe away from said first named means.

4. A globe support comprising a base, a ring upon which said globe may rest, means rotatably supporting said ring, and movably mounted spaced means selectively engageable with said globe on opposite sides of the center thereof along lines of contact to lift the globe out of contact with said ring.

5. A globe support comprising a base, a ring upon which said globe may rest, means on said base rotatably supporting said ring, movably mounted rollers selectively engageable with said globe on opposite sides of the center thereof along lines of contact and means supporting said rollers operable to lift said globe out of contact with said first named means.

6. A globe support comprising a base, a ring upon which said globe may rest, means rotatably supporting said ring, two angularly spaced pairs of rollers, the rollers of each pair being engageable with said globe on opposite sides of the center thereof, and means supporting said pairs of rollers and selectively engaging either pair of rollers with said globe to lift the globe out of contact with said ring.

7. A globe support comprising a base, means supporting said base rotatable about a substantially vertical axis, means selectively engageable with said globe to disengage the same from said base and to support said globe rotatable about a substantially horizontal axis, and a second means selectively engageable with said globe to disengage the same from said base and to support the same rotatable about a second horizontal axis angularly spaced from said first horizontal axis.

8. A globe support comprising means supporting the globe for rotation about a substantially vertical axis and inhibiting rotation thereof about any other axis while so supported, a means selectively engageable with said globe to disengage the same from said supporting means, said second means being operable when said first named selectively engageable means is out of engagement with said globe and supporting said globe rotatable about a horizontal axis and inhibiting rotation about any other axis while so supported, and a second means selectively engageable with said globe supporting said globe rotatable about a second horizontal axis angularly spaced relative to said first named horizontal axis.

9. A globe support comprising a means engageable with said globe for supporting the same rotatable about a substantially vertical axis while inhibiting rotation thereof while so supported about any other axis, and a second means selectively engageable with said globe, said second means disengaging said globe from said first named supporting means and supporting the globe rotatable about a substantially horizontal axis while inhibiting rotation thereof while so supported about any other axis.

10. A globe support comprising a means engageable with said globe supporting said globe rotatable about a first axis, a second means selectively engageable with said globe, said second means disengaging said globe from said first named supporting means and supporting the same rotatable about a second axis, and a third means selectively engageable with said globe, said third means operable when engaged to disengage said globe from said first and second supporting means and rotatably supporting said globe about a third axis.

11. A globe support comprising a means rotatably supporting said globe about one axis while inhibiting rotation thereof while so supported about any other axis, a second means selectively engageable with said globe, said second means disengaging said globe from said first named supporting means and rotatably supporting the same rotatable about a second axis while inhibiting rotation while so supported about any other axis, and a third means engageable with said globe, said third means operable when engaged to disengage said globe from said first and second supporting means and supporting the same rotatable about a third axis while inhibiting rotation while so supported about any other axis.

12. A globe support comprising a means engageable with said globe supporting the same rotatable about one axis while inhibiting pivotal movement while so supported about any other axis, a second means selectively engageable with said globe, said second means disengaging said globe from said first named supporting means and supporting said globe rotatable about a second axis while inhibiting rotation while so supported about any other axis, said axes or rotation intersecting at substantially right angles.

13. A globe support comprising a means engageable with said globe and supporting the globe rotatable about one axis while inhibiting rotation while so supported about any other axis, a second globe supporting means selectively engageable with said globe, said second means disengaging said globe from said first named supporting means to support the same rotatable about a second axis while inhibiting rotation while so supported about any other axis, a third means selectively engageable with said globe, said third means operable when engaged to disengage said globe from said first and second supporting means and supporting the globe rotatable about a third axis while inhibiting rotation while so supported about any other axis, said axes all intersecting at substantially right angles.

14. A globe support comprising a means engageable with said globe support, said globe rotatable about a substantially vertical axis, a pair of roller means selectively engageable with said globe, means supporting said roller means for engagement with said globe to raise said globe out of contact with said first named supporting means, and cam means for operating said roller means.

15. A globe support comprising a means for supporting the globe rotatable about a substantially vertical axis, a pair of roller means engageable with said globe on opposite sides of the center thereof, means supporting said roller means for movement toward and away from said globe and operable to raise said globe out of contact with said first named supporting means, a second pair of roller means engageable with said globe on opposite sides of the center thereof, means supporting said second roller means movable toward and away from said globe and operable to raise said globe out of contact with said first named supporting means, and cam means selectively operable to actuate either of said roller means.

16. A globe support comprising means normally supporting the globe rotatable about a substantially vertical axis, roller means engageable with said globe on opposite sides of the center of the globe, means supporting said roller means movable toward or away from said globe and operable to raise said globe out of contact with said first named supporting means, a second roller means engageable with said globe on opposite sides of the center thereof, means supporting said second roller means for movement toward or away from said globe and operable to raise said globe out of contact with said first named supporting means, cam means for actuating said roller supporting means, and means simultaneously moving all of the said cam means to selectively engage either of said roller means with said globe.

17. A globe support comprising means normally supporting the globe rotatable about a substantially vertical axis, roller means engageable with said globe on opposite sides of the center of the globe, means supporting said roller means movable toward or away from said globe and operable to raise said globe out of contact with said first named supporting means, a second roller means engageable with said globe on opposite sides of the center thereof, means supporting said second roller means for movement toward or away from said globe and operable to raise said globe out of contact with said first named supporting means, cam means for actuating said roller supporting means, and means simultaneously moving all of the said cam means to selectively engage either of said roller means with said globe, said last named means comprising a rotatably supported ring upon which said cam means are mounted.

18. A globe support comprising a means for supporting said globe rotatable about a substantially vertical axis, and roller means curved to fit the curvature of said globe selectively engageable with said globe to raise the globe out of contact with said first named supporting means.

19. A globe support in combination with a vertical wall including a casing projecting forwardly from the wall, a globe supporting mechanism having its center point in substantially the plane of the wall and having the portion of the mechanism lying forwardly of the wall enclosed within said casing, and said wall having an aperture therethrough of a size to accommodate said globe with substantially one-half of the globe projecting forwardly of the wall.

LOUIS H. POWELL.

REFERENCES CITED

The following references are of record in the file of this patent:

UNITED STATES PATENTS

| Number | Name | Date |
|---|---|---|
| 1,042,455 | Manson | Oct. 29, 1912 |
| 1,099,315 | Scholes | June 9, 1914 |
| 1,162,300 | Minkler | Nov. 30, 1915 |
| 2,060,777 | Haardt | Nov. 10, 1936 |
| 2,102,413 | Hall | Dec. 14, 1937 |
| 2,336,436 | Beindorf | Dec. 7, 1943 |

FOREIGN PATENTS

| Number | Country | Date |
|---|---|---|
| 808,938 | France | 1937 |

OTHER REFERENCES

Knott Catalogue of Scientific Instruments, 1916, page 46. Any well known automobile jack.